No. 817,376. PATENTED APR. 10, 1906.
H. P. KLINE.
PLANTER.
APPLICATION FILED SEPT. 2, 1905.
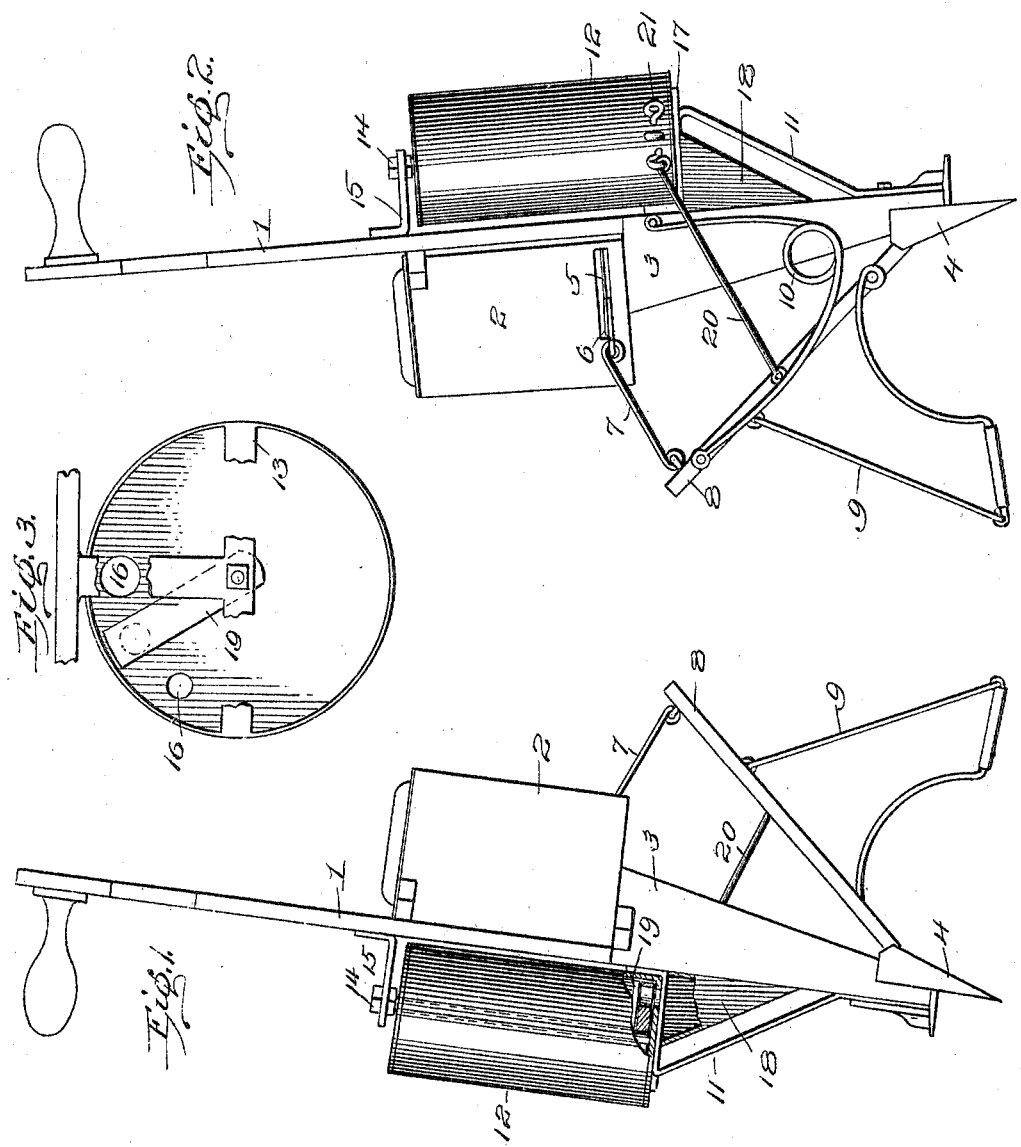
Inventor
H. P. Kline,
By W. T. Fitzgerald & Co.
Attorneys
Witnesses
J. M. Fowler Jr
Herbert D. Lawson

UNITED STATES PATENT OFFICE.

HENRY P. KLINE, OF RANDOLPH, OHIO.

PLANTER.

No. 817,376. Specification of Letters Patent. Patented April 10, 1906.

Application filed September 2, 1905. Serial No. 276,827.

*To all whom it may concern:*

Be it known that I, HENRY P. KLINE, a citizen of the United States, residing at Randolph, in the county of Portage and State of Ohio, have invented certain new and useful Improvements in Planters; and I do hereby declare the following to be a full, clear, and exact description of the invention, such as will enable others skilled in the art to which it appertains to make and use the same.

My invention relates to improvements in planters, and more particularly to devices of this character of the hand-operated type; and the object of the invention is to provide a fertilizer-distributer which is connected to the planter in such a manner that a portion of the fertilizer will be discharged during each planting operation.

The invention consists of a receptacle adapted to be mounted on the operating-lever of a planter and having an outlet in the bottom thereof, which is above a chute which is adapted to direct material into the grain-conveying chute of the device. The outlet-opening is of sufficient size to hold a desired quantity of fertilizer, and stationary cut-off devices are employed, whereby when the receptacle is rotated the contents of the outlet-opening will be discharged therefrom and said opening refilled alternately. The receptacle is adapted to be actuated by the same means ordinarily employed for actuating the dropping mechanism of the grain-receptacle.

The invention also consists of certain other novel features of construction and combination of parts, which will be hereinafter more fully described, and pointed out in the claims.

In the accompanying drawings I have shown the preferred form of my invention.

In said drawings, Figure 1 is a side elevation of the planter, the fertilizer-receptacle and its chute being shown partly in section. Fig. 2 is an elevation of the opposite side of the planter; and Fig. 3 is an enlarged plan view of the fertilizer-receptacle, its supporting-bracket being partly broken away.

Referring to the figures by numerals of reference, 1 is an operating-lever having a grain-receptacle secured to it and from the outlet of which extends a main chute 3, which is normally closed at the bottom by means of a shovel 4. Suitable dropping mechanism 5 is located within the receptacle 2 and is adapted to be actuated by a dog 6, which is connected by a rod 7 to a base-strip 8, which is rigidly connected to and extends from the shovel 4. This base-strip has a supporting-bracket 9 extending downward therefrom and is held normally pressed away from the lever 1 by a spring 10, which is connected at opposite ends to said lever and to the base-strip 8. It will be obvious, therefore, that whenever the lever 1 is pressed toward the base-strip 8 it will cause spring 10 to be put under tension and will slide the dog 6 into engagement with the dropping mechanism 5, so that when the lever 1 returns to its initial position said mechanism will cause the desired number of grains to fall into the chute 3.

All of the foregoing mechanism is old in the art, and I do not, therefore, base any claims thereon.

My invention consists of an attachment for such a device whereby fertilizer in desired quantities can be planted at the same time as the grain. This attachment consists of a supporting-bracket 11, which is secured to the operating-lever 1, and mounted on this bracket is a rotatable cylinder 12, having a T-shaped bracket 13 secured to the open upper end thereof. Extending loosely through this bracket and through the bottom of the cylinder 12 is a rod 14, which is immovably connected to a bracket 15, connected to the lever 1 at a point above the cylinder 12. The lower end of this rod engages the bracket 11. The bottom of the cylinder 12 is of considerable thickness and has a desired number of openings 16 therein, which are of different sizes. These openings are normally closed at their lower ends by a flange 17, which extends laterally from the upper end of a chute 18, which extends from a point adjacent the bottom of cylinder 12 and opens into the main chute 3. A blade or cut-off 19 extends from the rod 14 and rests on the bottom of cylinder 12. This blade is so disposed in relation to the upper end of bracket 11 that when the cylinder is in its normal position one of the openings 16 is closed by said bracket 11, while the other openings are closed by flange 17. When, however, the cylinder is oscillated, that opening which was in position upon the bracket 11 moves under the blade 19, so that any material contained within the opening 16 is free to drop over the edge of bracket 11 and into the chute 18. Motion is imparted to the cylinder 12 by means of a rod 20, which is secured at one end to the base-strip 8 and its other end to any one of a series of ears 21, extending laterally from the cylinder 12. One of these ears is provided for each opening 16, and by placing one end of the rod 20 in engagement with any one of these the corresponding opening 16 will assume its normal position on the bracket 11. As the openings 16 are of different sizes, the quantity of seed discharged will be governed by the size of the opening which normally assumes a position over the bracket 11. The adjustment above referred to is therefore provided for the purpose of utilizing any one of these openings 16 as an outlet.

In using the device herein described the receptacle 2 is filled with grain to be planted, while cylinder 12 is filled with a suitable fertilizer. The lever 1 is then pressed into the ground and swung toward the base-strip 8. This, as hereinbefore described, will actuate the dropping mechanism 5, so that a suitable number of grains will fall into the main chute 3. At the same time the rod 20 being fixedly held at one end by the base-strip 8 will press against the eye 21, secured to it, so as to cause cylinder 12 to partly rotate. This oscillation will cause the opening 16, which is normally mounted on bracket 11, to move off of said bracket and above chute 18, so that any fertilizer contained in said opening will drop into the chute. While the opening is in this position, the blade 19 will prevent the main portion of the fertilizer from falling through the opening and into the chute. As soon as the lever 1 is released the spring 10 will return all the parts to their normal positions and opening 16 will reassume its position away from under the blade 19, but above the bracket 11, and more fertilizer will fall into said opening, so as to be discharged into the chute when the operation above described is repeated.

It will be seen that this attachment is very simple and can be readily attached to a hand-operated planter such as herein described.

Having thus fully described my invention, what I claim as new, and desire to secure by Letters Patent, is—

1. In a planter the combination with a base-strip, an operating-lever, a grain-receptacle, a chute therefor and means operated by the lever for discharging grain into the chute; of a fertilizer attachment comprising an oscillatable receptacle having an outlet, said receptacle being connected to the operating-lever, means for oscillating the receptacle by actuating the operating-lever, a chute extending from said receptacle into the grain-chute, and a stationary cut-off device within the oscillatable receptacle.

2. A fertilizer attachment for hand-operated planters comprising brackets, an oscillatable receptacle mounted therebetween, said receptacle having an outlet normally closed by one of the brackets, a discharge-chute extending from the receptacle, and a stationary cut-off within the receptacle and secured to the bracket.

3. A fertilizer attachment for hand-operated planters comprising brackets, an oscillatable receptacle mounted between the brackets and having an outlet normally closed by one of the brackets, a chute extending from the receptacle adjacent the outlet thereof, a stationary cut-off blade within the receptacle and adapted, with said bracket, to alternately assume a position over the outlet, and means for connecting the cylinder to the base-strip of a hand-planter.

4. A fertilizer attachment for hand-operated planters comprising brackets, an oscillatable cylindrical receptacle mounted therebetween and having a series of openings in the bottom thereof, all of said openings being normally closed, a chute adapted to receive material from any of the openings, a stationary cut-off within the cylinder and adapted to close any of the openings when the same is in position over the chute, and means adjustably connected to the cylinder and adapted to be secured to the base-strip of a hand-planter.

In testimony whereof I have signed my name to this specification in the presence of two subscribing witnesses

HENRY P. KLINE.

Witnesses:
J. F. LANG,
N. D. HOSKIN